 United States Patent
Kawakami (12) 
(10) Patent No.: US 7,071,984 B2
(45) Date of Patent: Jul. 4, 2006

(54) IMAGING DEVICE FOR DIGITAL CAMERA HAVING PHOTODIODES DISPOSED OVER LIGHT SHIELDING MEMBRANE FOR SENSING BRIGHTNESS

(75) Inventor: Chikuni Kawakami, Saitama (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 743 days.

(21) Appl. No.: 10/225,155

(22) Filed: Aug. 22, 2002

(65) Prior Publication Data

US 2003/0043293 A1   Mar. 6, 2003

(30) Foreign Application Priority Data

Sep. 3, 2001   (JP)   ............................. 2001-265578

(51) Int. Cl.
 *H04N 5/335*   (2006.01)
 *H04N 5/222*   (2006.01)
 *H01L 31/0232*   (2006.01)

(52) U.S. Cl. ...................... 348/315; 348/312; 348/371; 257/435

(58) Field of Classification Search ................ 348/311, 348/315, 320, 234, 236, 237, 238, 370, 371; 257/435
See application file for complete search history.

(56) References Cited

U.S. PATENT DOCUMENTS

| | | | | |
|---|---|---|---|---|
| 4,266,163 A | * | 5/1981 | Lloyd | 315/151 |
| 4,531,078 A | * | 7/1985 | Canter et al. | 315/151 |
| 4,809,076 A | * | 2/1989 | Todaka et al. | 348/230.1 |
| 5,452,001 A | * | 9/1995 | Hosier et al. | 348/230.1 |
| 5,539,196 A | * | 7/1996 | Miyawaki et al. | 250/208.1 |
| 6,118,115 A | * | 9/2000 | Kozuka et al. | 250/208.1 |
| 2001/0003466 A1 | * | 6/2001 | Kubo | 348/366 |

* cited by examiner

*Primary Examiner*—Ngoc-Yen Vu
*Assistant Examiner*—Richard M. Bemben
(74) *Attorney, Agent, or Firm*—McGinn IP Law Group, PLLC (57) ABSTRACT

An imaging device includes photoelectric converting portions for converting light from a subject into signal charge pixel by pixel and transfer portions for transferring the signal charge generated by photometric conversion. Photometric photodiodes are disposed over light-shielding membranes covering the transfer portions. Photometric photodiodes are so disposed as to be distributed over an imaging surface of the imaging device. Each photometric area includes at least one photometric photodiode. When a flashlight is emitted, photocurrent output from each photometric photodiode is gathered separately with respect to each photometric area and amplified. The photocurrent of each photometric area is amplified with a gain corresponding to the photometric area, and then added up. Added photocurrent is integrated, and when a result of the integration reaches a predetermined level an emission stop signal of the flashlight is generated.

20 Claims, 8 Drawing Sheets

IMAGING DEVICE FOR DIGITAL CAMERA HAVING PHOTODIODES DISPOSED OVER LIGHT SHIELDING MEMBRANE FOR SENSING BRIGHTNESS

BACKGROUND OF THE INVENTION

1. Field of the Invention

The present invention relates to an imaging device used for a digital camera.

2. Background Arts

Now many digital cameras adopt a TTL photometry (Through The Lens photometry) system with high precision for a photometry to control exposure. This TTL photometry system measures brightness of a scene to be taken by using an output signal from an imaging device for taking the scene.

Many digital cameras also have an automatic flash device. The automatic flash device measures reflection of a flashlight from a subject with photo sensor, and automatically stops emission of the flashlight when detects that a quantity of the reflection of the flashlight reaches a predetermined level. Therefore, the automatic flash device prevents the subject from being illuminated so much with excessive emission of the flashlight and allows flash photography in a short-distance.

Recently, it is expected to adjust the quantity of the flashlight precisely by adopting the TTL photometry system even in the photography with the automatic flash device. Since the automatic flash device has to measure the reflection of the flashlight emitted instantaneously, quick response performance is required on a photo sensor. However, the imaging device cannot be used as the photo sensor of the automatic flash device because the imaging device takes time to storage and transfer signal charge. It is also considered to install a photo sensor inside a lens barrel, but the installation takes a lot of trouble.

SUMMARY OF THE INVENTION

A main object of the present invention is to provide an imaging device for a digital camera which can measure reflection of a flashlight with a TTL photometry system.

Another object of the present invention is to provide an imaging device for a digital camera which can be used for both measurement of reflection of a flashlight and photometry for exposure control.

Further another object of the present invention is to provide an imaging device for a digital camera which is easily installed in the digital camera.

To achieve the above and other objects, an imaging device according to the present invention includes photometric photodiodes disposed over light-shielding membranes, which cover transfer portions for sequentially transferring signal charge generated in photoelectric converting portions. Photocurrent output from each of the photometric photodiodes is weighted according to each of plural areas, into which an imaging surface of the imaging device is divided, and an adding circuit adds up the photocurrent for each area if each area has plural photodiodes. Then an integration circuit integrates the added photocurrent, and when a result of integration reaches a predetermined level an emission stop signal is generated.

Since the imaging device according to the present invention shortens time for photometry due to use of the photometric photodiodes, it is possible to measure reflection of a flashlight with the TTL photometry system. Also the imaging device is used for measuring brightness of a subject to control exposure.

Furthermore, the photometric photodiodes are disposed over the transfer portions, which are beside the photometric converting portions. Thus, the imaging device has an advantage of making efficient use of light not incident on the photoelectric converting portions which is part of light from the subject arriving at the imaging device.

Also a process for installation of the photometric photodiodes is unnecessary because the photometric photodiodes are integrally provided in the imaging device.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, same reference numerals designate like or corresponding parts throughout the several views, and wherein.

DETAILED DESCRIPTION OF THE EMBODIMENTS

Figure 1:
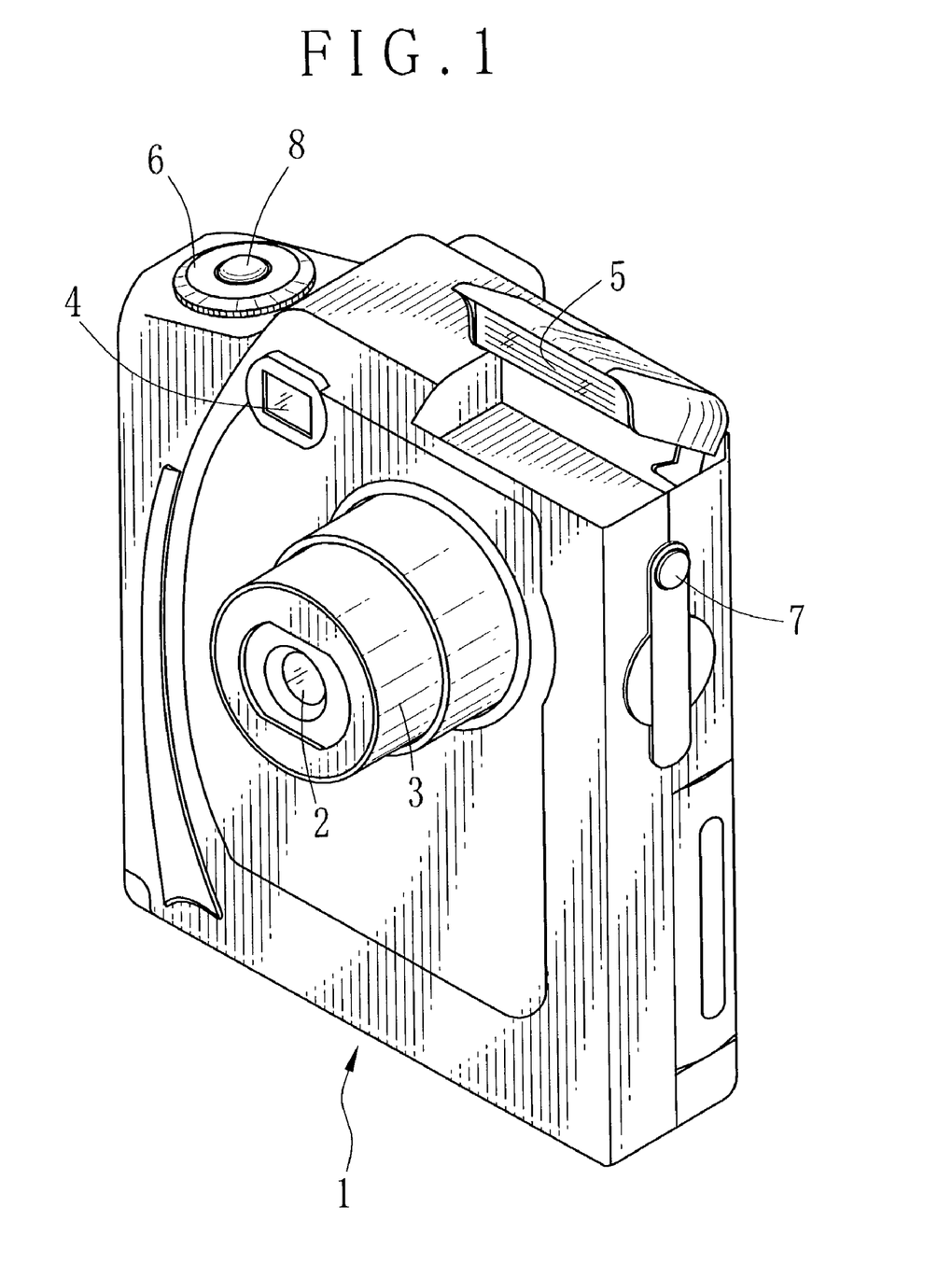
FIG. 1 is a front perspective view of a digital camera.

Referring to FIG. 1, there are provided a lens barrel 3 holding taking lenses 2 and an optical finder 4 in a front wall of a digital camera 1. In a top wall of the digital camera 1, are provided a pop-up type flash projector 5, a functional dial 6, and a release button 8 disposed at the center of the functional dial 6. The flash projector 5 pops up on operating a pop-up button 7 on a sidewall of the digital camera 1, and is returned to an original position manually. The digital camera 1 is changed over from the functional dial 6 between an automatic setting and a manual setting for adjustments of exposure and focus. In the automatic setting the exposure and the focus are adjusted in accordance with predetermined photographic patterns like long-distance, short-distance, and indoor photography.

Figure 2:
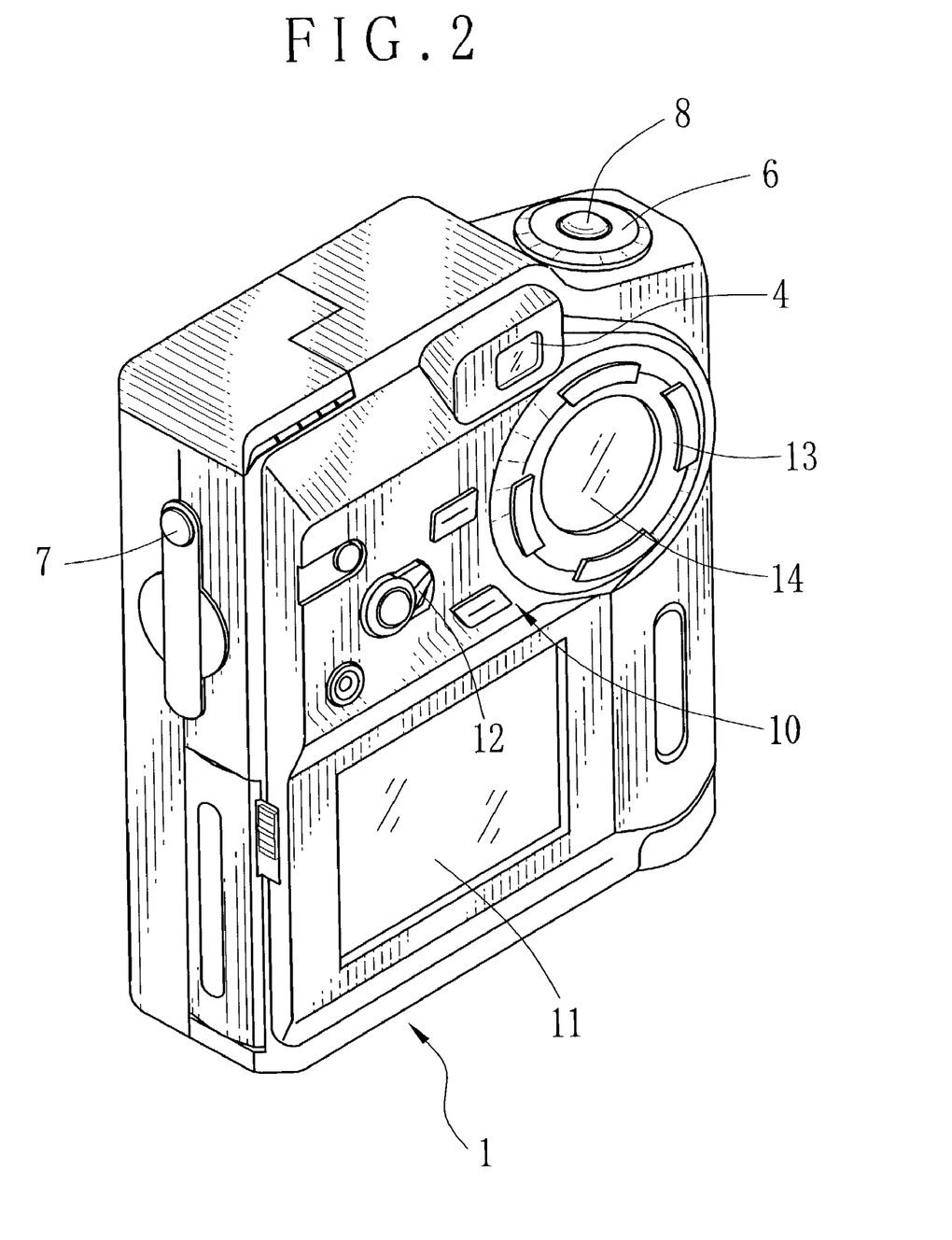
FIG. 2 is a rear perspective view of the digital camera of FIG. 1.

Referring to FIG. 2, an operating panel 10 having various switch buttons and a color liquid crystal color display 11 are provided in a rear wall of the digital camera 1. In the operating panel 10 a mode-switch lever 12 is provided, from which the digital camera 1 is changed over between a photography mode and a reproduction mode. The liquid crystal color display 11 serves as an electronic viewfinder showing an image of a subject in the photography mode, and displays a photographed image of the subject in the reproduction mode. A cross key 13 is operated to adjust exposure manually and change resolution of the image. Setting conditions of various items can be checked on a reflective-type liquid crystal monochromic display 14.

Figure 3:
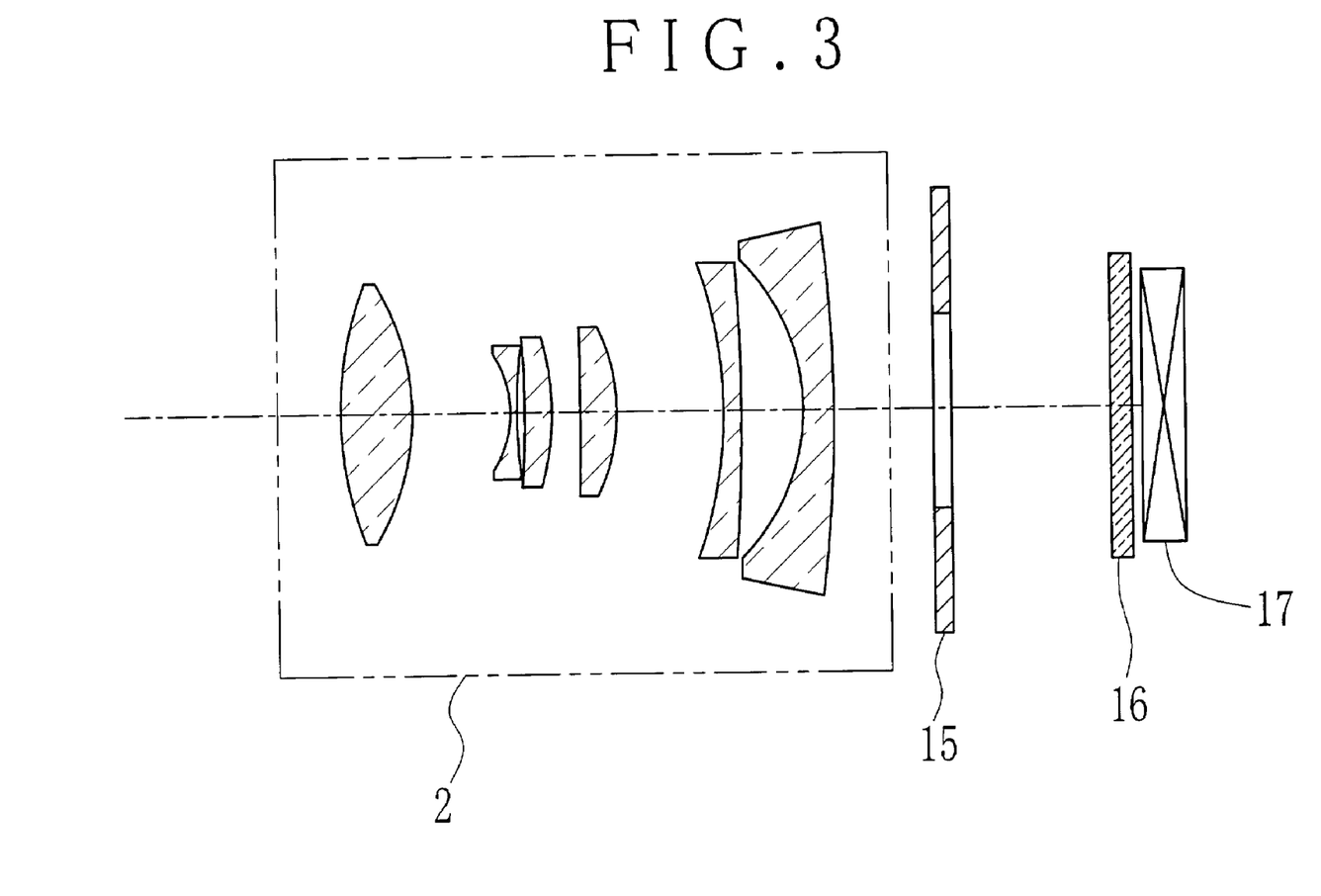
FIG. 3 is a sectional view showing an imaging system.

Referring to FIG. 3, there are provided taking lenses 2, a stop 15, an optical low-pass filter 16, and an imaging device 17 inside the lens barrel 3. Light from the subject passing through the taking lenses 2 is stopped down at the stop 15. Then the optical low-pass filter 16 eliminates a part of the light with high spatial frequencies, and remaining light forms an optical image on the imaging device 17.

Figure 4:
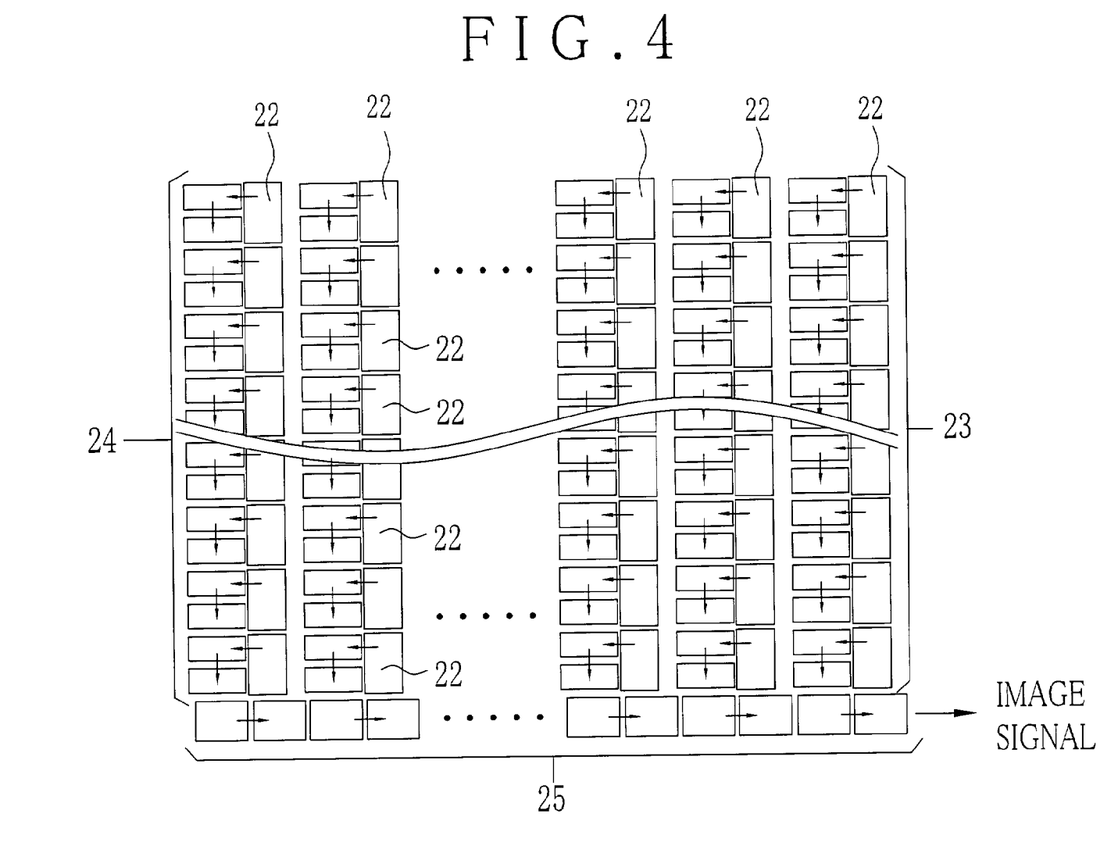
FIG. 4 is a schematic plan view showing structure of an imaging device.

Referring now to FIG. 4, the imaging device 17 has plural linear photoelectric converting portions 23, plural linear vertical transfer CCDs 24, and a horizontal transfer CCD 25. In each of the photoelectric converting portions 23, plural imaging photodiodes 22 which convert incident light into photocurrent are arranged in a line. The photocurrent generated by each of the imaging photodiodes 22 is accumulated as signal charge. The signal charge is transferred to a vertical direction by the vertical transfer CCDs 24, and then transferred to a horizontal direction by the horizontal transfer CCD 25. The vertical transfer CCDs 24 and the horizontal transfer CCD 25 are referred to as transfer portions 26. The signal charge transferred by the horizontal transfer CCD 25 is output as an image signal.

Figure 5:
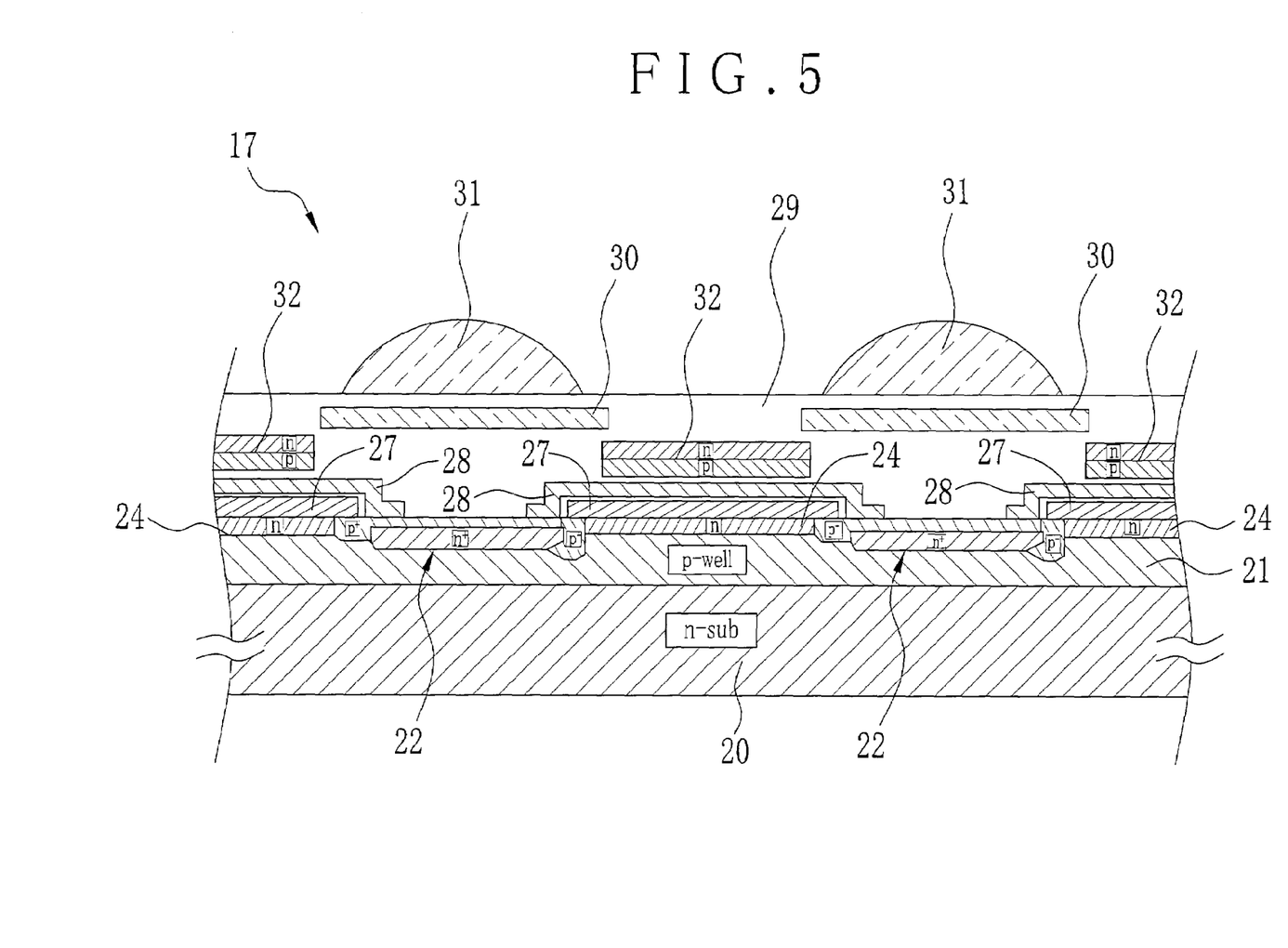
FIG. 5 is a sectional view showing the structure of the imaging device.

FIG. 5 shows sectional structure of the imaging device 17. The imaging photodiodes 22 are formed onto a p-well 21, which is formed on an n-substrate 20 with middle concentration. Between each of the imaging photodiodes 22, the vertical transfer CCDs 24 are arranged. The vertical transfer CCDs 24 sequentially transfer the signal charge to the horizontal transfer CCD 25 in accordance with drive pulses transmitted through electrodes 27. Above the electrodes 27, light-shielding membranes 28 are formed. The light-shielding membranes 28 eliminate a function of photoelectric conversion of the vertical transfer CCDs 24 so as to prevent noise from getting into the signal charge during transfer. Straight over the imaging photodiodes 22, micro color filters 30 and micro lenses 31 are disposed inside and on a flattening layer 29. Over the light-shielding membranes 28, photometric photodiodes 32 are disposed. The photometric photodiodes 32 are formed beside the imaging photodiodes 22. Leads to take out photocurrent from each of the photoelectric photodiodes 32 are omitted in FIG. 5.

Figure 6:
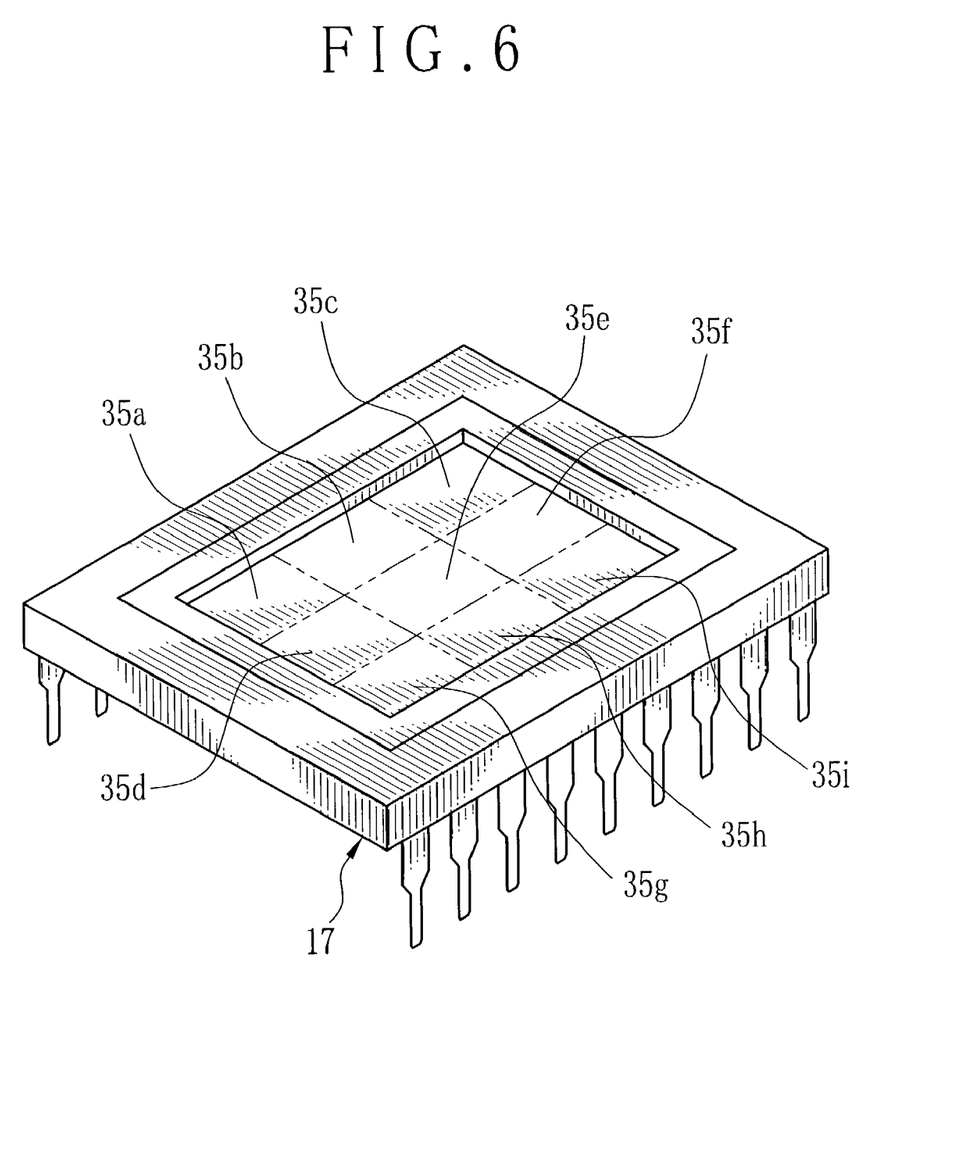
FIG. 6 is a perspective view of the imaging device.

The photometric photodiodes 32 are distributed all over an imaging surface of the imaging device 17. Taking a case, as shown in FIG. 6, where the imaging surface of the imaging device 17 is divided into three-by-three photometric areas 35a–35i, each of these nine photometric areas 35a–35i includes at least one photometric photodiode 32. In a case where there are plural photometric photodiodes 32 in each area, the photocurrent from each photometric photodiode 32 is added up with respect to each photometric area and sent to a logarithmic compression circuit 41.

Figure 7:
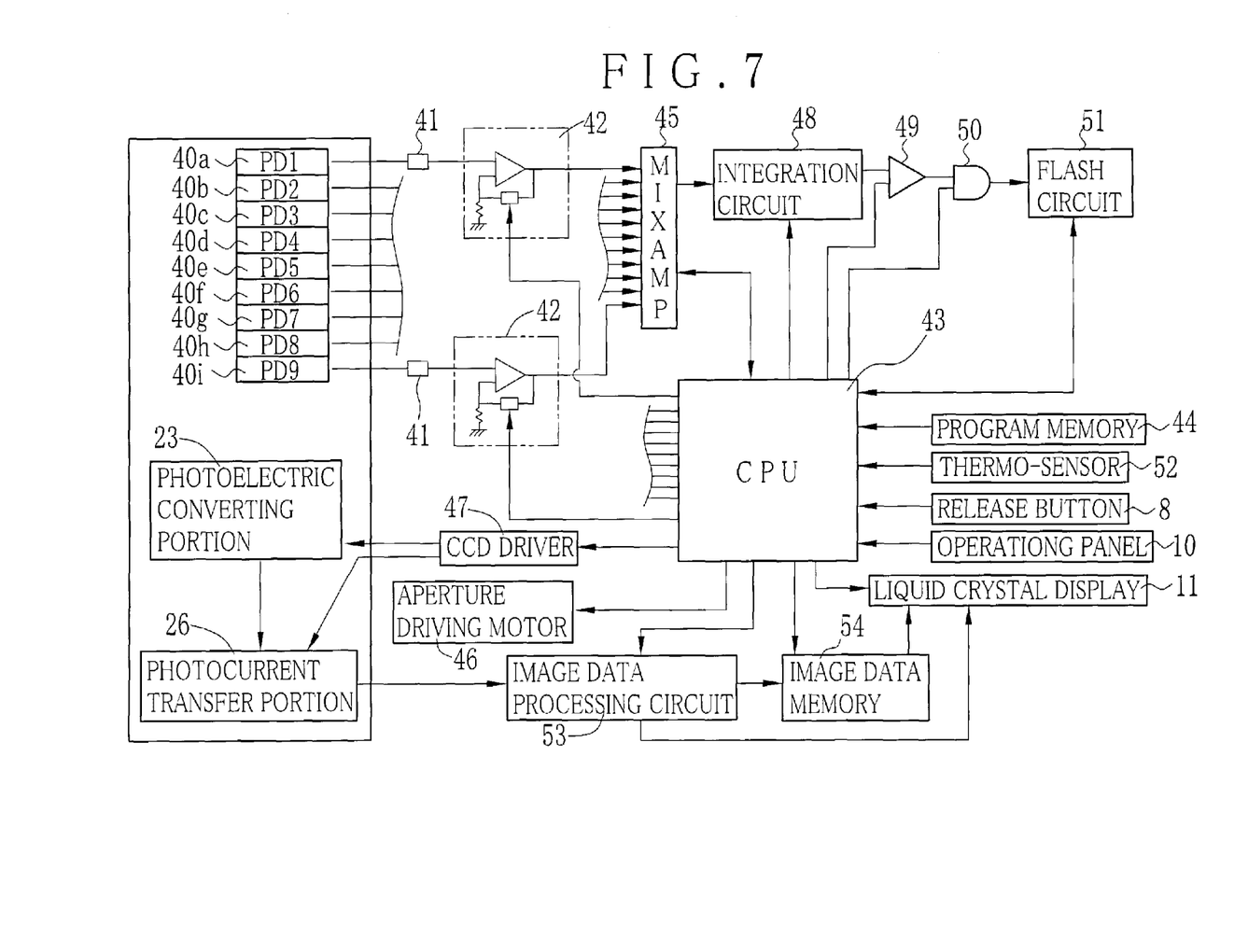
FIG. 7 is a block diagram showing electrical structure in the digital camera.

As shown in FIG. 7, reference numerals 40a–40i represent plural photometric photodiodes disposed inside the photometric areas 35a–35i respectively. The photometric photodiodes 40a–40i, to which a voltage for reverse bias is applied, generate photocurrent in accordance with intensity of incident light. The photocurrent from each of the photometric photodiodes 40a–40i is compressed by a logarithmic compression circuit 41, and then amplified by a variable gain amplifier 42. The variable gain amplifier 42 can freely change a gain in accordance with a control signal from a CPU 43. The logarithmic compression circuit 41 and the variable gain amplifier 42 are provided for each of the photometric areas 35a–35i, which are not shown in FIG. 7 though. The photocurrent from every photometric area 35a–35i is added up by a MIXAMP 45. A signal from the MIXAMP 45 is integrated by an integration circuit 48. Then, a comparator 49 compares this integrated value with a predetermined level. This result of the comparison is sent to the flash circuit 51 as a stop signal through an AND gate 50. The photometric photodiodes 40a–40i, the variable gain amplifier 42, the MIXAMP 45, the integration circuit 48, the comparator 49, and the AND gate 50 constitute an automatic flashlight control circuit.

Now operation of the circuits will be described in two cases, one of which is photometry of subject's brightness and another is photometry of reflection of a flashlight. First, in the photometry of subject's brightness, the CPU 43 sends the MIXAMP 45 a command to operate for the photometry. The MIXAMP 45 responds to the command and outputs a value of the added photocurrent to the CPU 43. The CPU 43 determines an optimum combination of a stop aperture size and a shutter speed (an signal charge storage time) for photography from the value of the photocurrent by means of running a program stored in a program memory 44, and outputs an exposure control signal to drive an aperture driving motor 46 and a CCD driver 47. Therefore, the photography is carried out with the optimum aperture size of the stop 15 and shutter speed. Besides, an amount of the exposure may be determined from distribution of the brightness in a scene to be taken by means of taking in the values of the photocurrent from each photometric area after analog-to-digital conversion.

Figure 8:
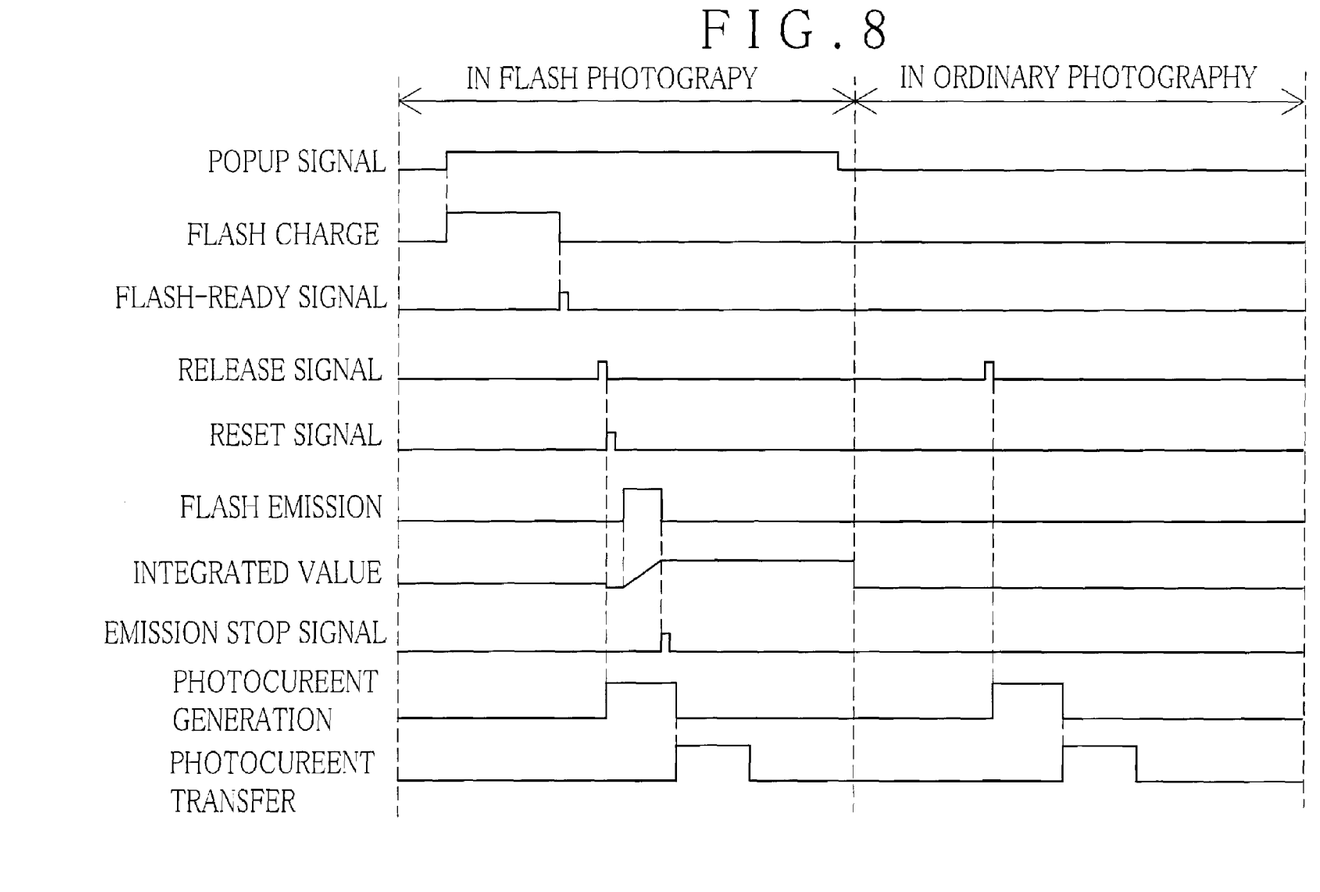
FIG. 8 is a time chart showing a flow of electrical operation of the digital camera.

Secondly, the operation of the circuit during the photometry of the reflection of the flashlight will be described below. As is commonly known, a flash circuit 51 has the flash projector 5, a booster circuit, a main capacitor, a trigger circuit, a stop emitting circuit, and the like. When the flash projector 5 is in a pop-up position, the CPU 43 outputs a pop-up signal to the flash circuit 51, as shown in FIG. 8. The pop-up signal makes the booster circuit operate and the main capacitor start to be charged in the flash circuit 51. When the main capacitor is completely charged, the flash circuit 51 outputs a flash-ready signal to the CPU 43. When the release button 8 is operated after the CPU 43 receives the flash-ready signal, the CPU 43 outputs the trigger signal to the flash circuit 51, so that the trigger circuit is operated and the flash projector 5 emits a flashlight by discharge current from the main capacitor.

Concurrently with the output of the trigger signal, the CPU 43 sends a reset signal to an integration circuit 48 and an emission control signal to the AND gate 50. The reset signal activates the integration circuit 48 after deleting remaining signals in the integration circuit 48. Thus, as shown in FIG. 7, total photocurrent output from the MIXAMP 45 is input into the comparator 49 after being integrated by integration circuit 48. The comparator 49 compares a result of the integration and a predetermined integral level. When the result reaches the integral level, the comparator 49 outputs an integration-completion signal to the AND gate 50. The AND gate 50, in response to the emission control signal from the CPU 43 and the integration-completion signal from the comparator 49, outputs an emission stop signal to the flash circuit 51. In the flash circuit 51, the emission stop signal activates the stop emitting circuit and the emission from the flash projector 5 is stopped.

Now operation of the present invention will be described below. When the digital still camera 1 is started with a photography mode, the CPU 43 sends a control signal to the CCD driver 47 to drive the imaging device 17 to convert an optical image of a subject into signal charge pixel by pixel. In turning on the liquid crystal display 11 from the operation panel 10, a screen displays an image of a subject, which is under photography by the imaging device 17.

The digital camera 1 is preset on a center-weighted measuring. It means that the photocurrent from the photometric area 35e, which is in the center of the imaging surface of the imaging device 17, is amplified with a large gain by the variable gain amplifier 42. On the other hand, the photocurrent from the other photometric areas is amplified with a small gain. After the amplification, all the photocurrent from every photometric area 35a–35i is added up by the MIXAMP 45, converted into brightness data by an analog-to-digital converter (not-illustrated), and then sent to the CPU 43. The CPU 43 processes this brightness data so as to generate the exposure control signal. Therefore, the optimum combination of the aperture size of the stop 15 and the shutter speed is determined.

At this time, if the brightness is under a predetermined level, the liquid crystal display 11 performs a warning to use the flash. In response to the warning, when a user pushes the pup-up button 7, the flash projector 5 pops up and the flash circuit 51 starts to be charged. When the charge is completed, the flash circuit 51 sends the flash-ready signal to the CPU 43, so that the liquid crystal display 11 shows that the flash is ready. After that, when the user pushes release button 8, the CPU 43 sends the trigger signal to the flash circuit 51, the reset signal to the integration circuit 48, and the emission control signal to the AND gate 50. In response to the reset signal, the integration circuit 48 starts to operate after being reset. In response to the trigger signal, the flashlight is emitted from the flash projector 5. Reflection of the flashlight arrives at the imaging device 17 through the taking lenses 2.

The reflection of the flashlight coming into the photometric photodiodes 32 in the imaging surface is converted into photocurrent therein. The photocurrent gathered separately with respect to each photometric area 35a–35i is processed through the logarithmic compression circuit 41 and the variable gain amplifier 42, and then added up by the MIXAMP 45. A value of the photocurrent output from the MIXAMP 45 is integrated by the integration circuit 48, and sent to the comparator 49. The comparator 49 compares a result of the integration and the predetermined integral level. When the result reaches the integral level, the comparator 49 outputs the integration-completion signal to the AND gate 50. Since the AND gate 50 outputs the emission stop signal to the flash circuit 51 in response to the emission control signal from the CPU 43 and the integration-completion signal from the comparator 49, the emission of the flashlight from the flash projectors is stopped.

The reflection of the flashlight coming into the micro lenses 31 under a proper amount of the flash emission is condensed with the micro lenses 31 and divided through the micro color filters 30 into R (red), G (green), and B (blue), and is converted into image signals by the imaging photodiodes 22. Then, in accordance with the drive pulses sent from the CCD driver 47 through the electrodes 27, the image signals of each color are sequentially transferred from the photoelectric converting portions 23 through the transfer portions 26. The transferred image signals are input into an image data processing circuit 53. The image data processing circuit 53 processes the image signals with a white balance adjustment, a gamma correction, and the like, and then digitizes the image signals to make image data. The image data are recorded onto an image data memory 54.

When the digital camera 1 is set on the reproduction mode by operating the mode-switching lever 12, the image data is read out from the image data memory 54 and the liquid crystal display 11 displays the image of the subject photographed with the flashlight. The photographed image is sharp since the proper amount of the flashlight has been emitted.

Now operation of the digital camera 1 on a daylight photography mode will be described below. The liquid crystal display 11 displays nine-split cells (not-illustrated), which correspond to the photometric areas 35a–35i of the imaging device 17. When the digital camera 1 is set on the center-weighted measuring, a center cell of the screen is surrounded with a bright frame (not-illustrated). The user can shift the position of the bright frame by operating the cross key 13 so as to select any photometric area. Since the variable gain amplifier 42 heavily weights brightness data of a selected photometric area in the liquid crystal display 11, exposure of this photometric area is optimum.

The CPU 43 determines the optimum combination of the aperture size and the shutter speed for the photography based on the photometric value. On operating the release button 8, an image of a subject formed on the imaging device 17 at the moment is taken in and recorded onto the image data memory 54 as image data. Then, when the digital camera 1 is changed over to the reproduction mode, the liquid crystal display 11 displays a photographed image.

In the above embodiment, the brightness signals are processed separately with respect to each of nine-split photometric areas in the imaging surface of the imaging device 17. However, it maybe possible to process the brightness signals separately with respect to each of four-split or sixteen-split photometric areas. Also flash photography with weighting a specific photometric area may be possible by means of selecting a photometric area of which photocurrent is amplified with the large gain.

The present invention may be applied to a video camera for recording moving images and the like, besides the digital camera for mainly recording static images.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. An imaging device for a digital camera comprising:
   photoelectric converting portions for photoelectrically converting an optical image of a subject into signal charge pixel by pixel;
   transfer portions for transferring said signal charge from said photoelectric converting portions;
   light-shielding membranes for covering said transfer portions and preventing light from getting into said transfer portions; and
   at least one photometric photodiode disposed over said light-shielding membranes, for measuring brightness of said subject.

2. An imaging device for a digital camera comprising:
   plural photoelectric converting portions disposed at predetermined intervals onto an imaging surface on which an image of a subject is formed, each of said photoelectric converting portions comprising plural imaging photodiodes arranged linearly;
   plural linear transfer portions for transferring signal charge, which is charged photocurrent from each of said imaging photodiodes, each of said transfer portions arranged alternatively with each of said photoelectric converting portions;
   plural light-shielding membranes disposed over each of said transfer portions; and plural photometric photodiodes disposed over each of said light-shielding membranes.

3. An imaging device as recited in claim 2, wherein said imaging surface is divided into plural areas, each of said areas having at least one of said photometric photodiodes.

4. An imaging device as recited in claim 3, wherein said digital camera comprises:
a variable gain amplifier provided for each of said areas, said variable gain amplifier amplifying photocurrent from said photometric photodiodes with a gain corresponding to each of said areas;
an adding circuit for adding up signals from each of said variable gain amplifiers;
an integration circuit for integrating signals from said adding circuit synchronously with emission of a flashlight; and
a comparator for outputting an emission stop signal of said flashlight when signals from said integration circuit reach a predetermined level.

5. An imaging device as recited in claim 4, wherein a gain is supplied to one of said variable gain amplifiers which is provided for a designated area among said plural areas and which gain is larger than a gain supplied to a variable gain amplifier provided for another area among said plural areas, thereby providing a weighting effect for said designated area.

6. The imaging device of claim 5, wherein said designated area is selectable by a user input.

7. A digital camera, comprising:
an imaging device comprising:
    a photoelectric converting portion for photoelectrically converting an optical image of a subject into a signal charge pixel by pixel;
    a transfer portion for transferring said signal charge from said photoelectric converting portion;
    light-shielding membranes for covering said transfer portion and preventing light from getting into said transfer portion; and
    at least one photometric photodiode disposed on an upper surface of one or more portions of said light-shielding membranes, for measuring a brightness of said image.

8. The digital camera of claim 7, further comprising:
a flash light;
an integration circuit for integrating signals from said at least one photometric photodiode synchronously with an emission from said flash light; and
a comparator for outputting an emission stop signal for said flash light when a signal from said integration circuit reaches a predetermined level.

9. The digital camera of claim 8, further comprising an amplifier to amplify signals from said at least one photometric photodiode and to provide an input signal into said integration circuit, wherein said integration circuit is also used to provide a measurement of said brightness of said image as well as control said emission stop signal.

10. The digital camera of claim 9, wherein said amplifier comprises a variable gain amplifier.

11. The digital camera of claim 10, wherein a user input can selectively adjust said gain of said variable gain amplifier.

12. The digital camera of claim 7, wherein said imaging device comprises a plurality of areas for said image, each area respectively comprising:
a photoelectric converting portion for photoelectrically converting an optical image of a subject into a signal charge pixel by pixel;
a transfer portion for transferring said signal charge from said photoelectric converting portion;
light-shielding membranes for covering said transfer portion and preventing light from getting into said transfer portion; and
at least one photometric photodiode disposed over one or more portions of said light-shielding membranes, for measuring a brightness of that area of said image.

13. The digital camera of claim 12, further comprising:
a flash light;
an integration circuit for integrating signals from all of said at least one photometric photodiode from said plurality of areas of said image synchronously with an emission from said flash light and for providing a measurement of said brightness of said image; and
a comparator for outputting an emission stop signal for said flash light when a signal from said integration circuit reaches a predetermined level.

14. The digital camera of claim 13, further comprising:
an amplifier provided for each of said areas for amplifying a photocurrent from said photometric photodiodes in said area; and
an adding circuit for adding up signals from each of said amplifiers, an output of said adding circuit provided as an input into said integration circuit.

15. The digital camera of claim 14, wherein said amplifier for each said area comprises a variable gain amplifier for at least one said area, thereby providing a variable gain for said at least one area into said integration circuit.

16. The digital camera of claim 15, wherein a user input selectively adjusts said gain of said variable gain amplifier for at least one area, thereby providing a variable weighting effect of brightness for said at least one area of said image.

17. The digital camera of claim 15, wherein a gain of a variable gain amplifier of at least one of said areas is preset to have a gain higher than a gain of a variable gain amplifier of another area.

18. The digital camera of claim 17, wherein said at least one area having a variable gain amplifier with said preset higher gain comprises a center portion of said image.

19. The digital camera of claim 17, wherein a user can selectively change which area has said higher gain.

20. The digital camera of claim 14, wherein said amplifier for each said area comprises a variable gain amplifier, thereby providing a variable gain for each said area, and at least one of said variable gain amplifiers for one of said areas is preset to a gain higher than any other area, and a user input selectively changes which said at least one area has its variable gain amplifier preset to said higher gain.

* * * * *